3 Sheets—Sheet 1.
T. J. CHUBB.
MAKING STEEL DIRECT FROM ORE.
No. 65,473. Patented June 4, 1867.
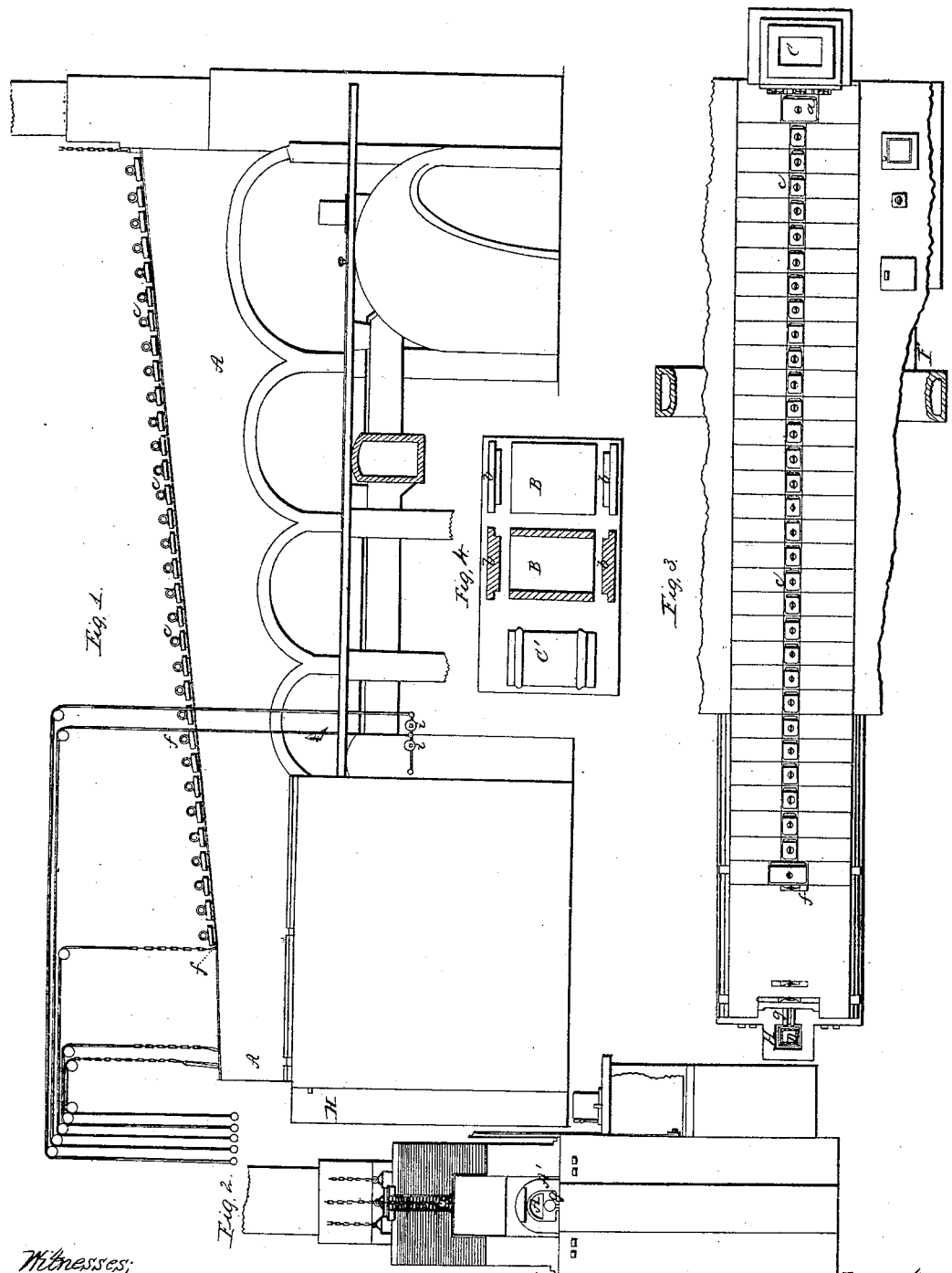

3 Sheets—Sheet 2.
T. J. CHUBB.
MAKING STEEL DIRECT FROM ORE.
No. 65,473. Patented June 4, 1867.
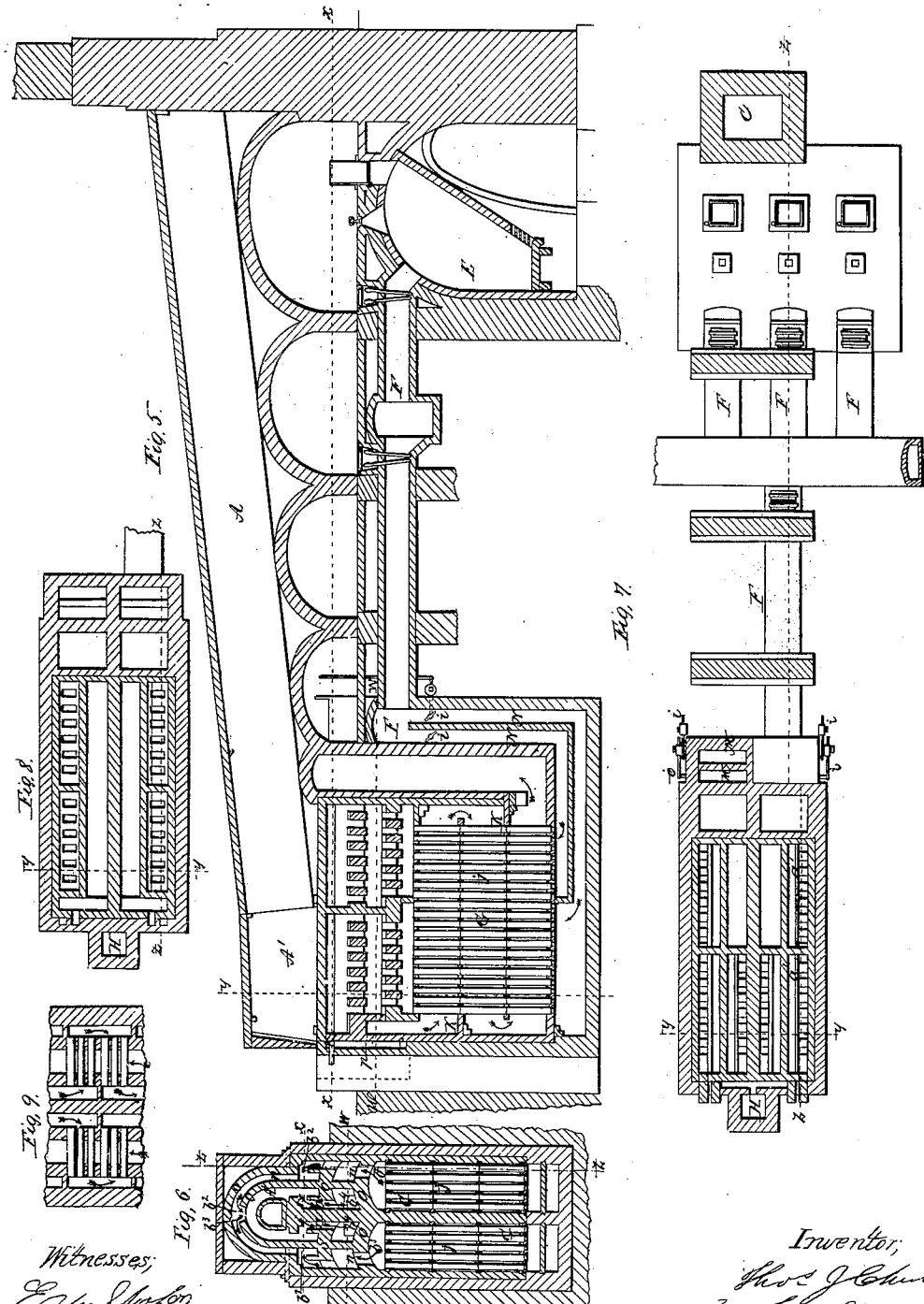

3 Sheets—Sheet 3.
T. J. CHUBB.
MAKING STEEL DIRECT FROM ORE.
No. 65,473. Patented June 4, 1867.
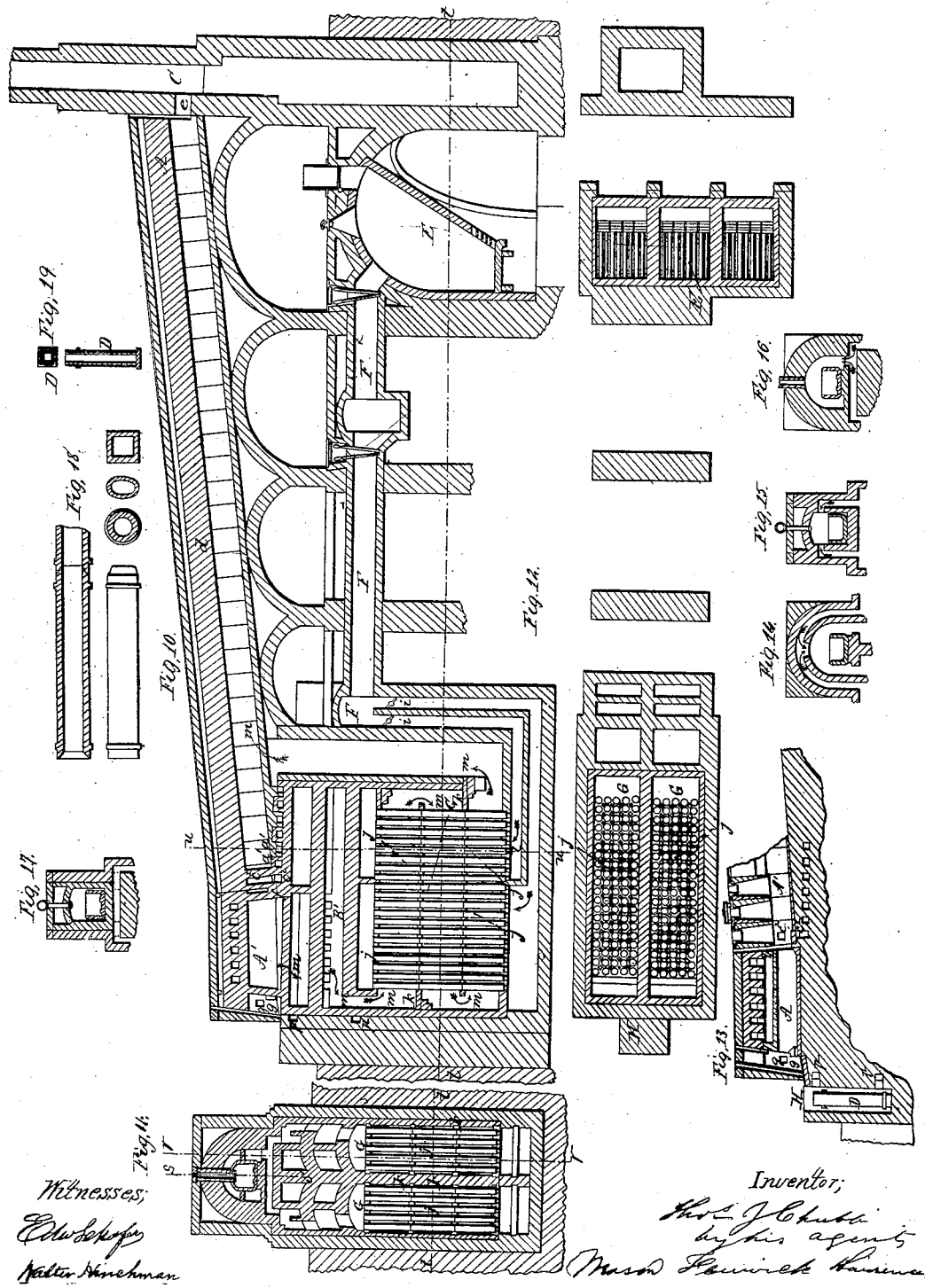

UNITED STATES PATENT OFFICE.

THOMAS J. CHUBB, OF BROOKLYN, E. D., NEW YORK.

IMPROVEMENT IN MAKING STEEL DIRECT FROM ORE.

Specification forming part of Letters Patent No. 65,473, dated June 4, 1867.

*To all whom it may concern:*

Be it known that I, THOMAS J. CHUBB, of Brooklyn, E. D., in the county of Kings and State of New York, have invented a new and improved furnace and process of making steel bars, ingots, or castings of steel direct from the ore; and I do hereby declare the following to be a full, clear, and exact description thereof, reference being had to the accompanying drawings, making part of this specification, in which—

Figure 1, Sheet 1, represents a longitudinal exterior elevation of the furnace, with a gas-generating, gas-heating, or a heat-regenerating apparatus attached; Fig. 2, an end view of the same; Fig. 3, a plan thereof; and Fig. 4 is a view, on a larger scale, of cylinders, molds, or cases, in which the ore to be treated with the requisite carbonaceous matter may be placed. In Sheet 2, Fig. 5 represents a vertical longitudinal section of the furnace, with its several connections, including deoxidizing, carbonizing, and melting chamber, or chambers, regenerator, &c., said section being taken through the line $z\ z$ in Figs. 6, 7, and 8; Fig. 6, a transverse section of the same through the line $y\ y$ in Figs. 5, 7, and 8; Fig. 7, a horizontal sectional view thereof through the lines $x\ x$ in Figs. 5 and 6; Fig. 8, a horizontal section of the same in part through line $w\ w$ in Figs. 5 and 6; Fig. 9, a horizontal section of a modification of the tubular arrangement employed in connection with, or as part of, a heat-regenerating apparatus in treatment of the ore. In Sheet 3, Fig. 10 is a vertical longitudinal section of the furnace and its connections, taken as indicated by the lines $v\ v$ in Fig. 11. Fig. 11 is a transverse section of the same through the lines $v\ v$ in Fig. 10. Fig. 12 is a horizontal section of the same in part, through the line $t\ t$ in Figs. 10 and 11; Fig. 13, a longitudinal section of the same through the line $s\ s$ in Fig. 11; Figs. 14, 15, 16, and 17 are sectional elevations of modifications of the melting, deoxidizing, and carbonizing chambers; Fig. 18, outside and sectional views, on an enlarged scale, of the tubes used in connection with the heat-regenerating furnace; Fig. 19, a longitudinal and transverse section of one of the molds in which the metal is or may be cast.

My invention consists in a mode of preparing, packing, balling, or incasing purified magnetic oxides of iron ore sands, finely-pulverized iron ore mechanically and artificially purified, and the deoxidizing and carbonizing matter preparatory to submitting it or them to the heat of a furnace; in a novel construction of a chamber for conducting the deoxidizing and carbonizing part of the process in connection with a melting-chamber; in a furnace retort or chamber for reducing the ore or spongy mass of deoxidized or carbonized ore or carburet of iron, which is provided with a gate or gates arranged for closing or opening the chamber, for the purpose of immersing the sponge into the bath of molten metal, thereby reducing it into a homogeneous mass, and for manipulating or chemically and mechanically operating on the molten metal therein, and chemically changing the volatile matter by aid of heated air and gas from a regenerator; in a novel mode of casting the molten metal, and producing a solid casting, retaining the heat therein until rolled into bars or otherwise by and with a gas-generating and reheating apparatus, gas being admitted therein for expelling the air; in the application and combination of a gas-generating and a reheating or regenerative gas and air heating apparatus, with a desulphurizing, deoxidizing, or a carbonizing chamber; in the application and combination of a gas-generating and a reheating or regenerative gas and air heating apparatus with a sponge reducing or melting chamber, operated in connection with a chamber or apparatus for deoxidizing or carbonizing iron ore; in a method of heating the several chambers, or the deoxidizing, carbonizing, melting, and mold chambers; in a method of heating the mold, ingot, and casting, or cooling reheating temperature, or tempering and annealing the same.

The pure, nearly pure, or purified sands of iron ore, such as the magnetic-iron sands found on the beach and bottoms of many rivers, on sea, lake, and ocean coasts, or pulverized iron ore, mechanically or otherwise artificially purified of the earthy and crystallized matters that are mechanically mixed therewith, after being thoroughly mixed in any convenient manner with proper proportions of carbonates and other deoxidizing and carbonizing matters, is or may be mixed with glutinous matter into concrete, or may be formed into lumps, balls, or cylinders, or incased into cylinders B, Fig. 4, to be pressed into form therein. These cylinders may be made of iron, and the mixed or prepared ore sufficiently pressed therein to cause it to pack and adhere together; may then be taken out and smeared or coated with clay, tar, resin, or any other suitable cohesive matter that will form an outer coating or casing around or combining with the ore, &c., to retain it in shape; or these cylinders may be made of clay, or iron lined with clay, plumbago, or other suitable material, and smeared with tar or other suitable glutinous matter; or the cylinders so smeared inwardly may be treated with a coating of wrought-iron or highly-carbonized iron sponge ground fine, the inner sides of the heads $z$ of said cylinders being similarly lined and coated. Thus prepared and filled with the prepared ore, the whole are or may be submitted to heat sufficient to cause the inner mass to adhere together and become somewhat smaller in bulk, when the outer mold may be removed from the newly-formed cylinder or core of ore, and the matter mixed therewith is then or may be placed in the deoxidizing-chamber A, Fig. 1, Sheet 1. Or, another convenient mode of forming the mass of mixed and prepared ore into shape for working is as follows: It may be put into thin cylinders C', Fig. 4, perforated at top and bottom, made of clay, sheet or cast iron, or other suitable material, and then introduced into the deoxidizing and carbonizing chamber A at its top, through opening $a$, Fig. 1, to be, as will be hereinafter described, immersed in molten metal, for the purpose of reducing and converting the metal into a homogeneous liquid form known as cast-steel. Where iron cylinders are used, the cylinders themselves will be also reduced into a liquid state and diffused through the mass, and finally into the casting. Such use of sheet-iron cylinders essentially differs from the employment of sheet-iron casing for making wrought-iron direct from the ore, and which are not converted into a new element as carburet of iron or steel, or immersed in molten metal.

The long inclined tunnel or conduit A is provided along its top with apertures covered by lids or stoppers $c$, (shown in Figs. 1 and 3, Sheet 1,) for working or forwarding, by cars or otherwise, the mass or cylinders of ore that are becoming gradually heated, deoxidized, and carbonized down the tunnel or toward the melting chamber A'. The heat may be applied to this carbonizing-chamber or tunnel-shaped furnace either internally or externally, or both ways, at the will of the operator, preferably by hot air, gases, or flame admitted and supplied by or from a gas heating and regenerating or reclaiming apparatus, as will be hereinafter more fully described. Said chamber A is also provided with suitable valves or dampers for regulating the heat, or the action of the heated air and gas or gases upon the mass under treatment. The heated gas or gases is or may be admitted to deoxidize and carbonize the ore, while the heated air is or may be admitted to inflame the gas or gases therein. All the valves of this chamber must never be fully closed; the upper damper, leading into the chimney, at all times should be partly opened.

The mass or masses of ore, with the carbonaceous substances, under treatment in the tunnel A is thus gradually heated as it is rolled or moved along toward the lower end of the furnace, and after a sufficient exposure in this the deoxidizing and carbonizing chamber, it is finally converted while in this chamber into a carburet, care being taken in regulating the heat not to melt the same in this operation.

In these masses of steel sponge or carburet of iron the carbonaceous matter originally mixed with the ore is or should be wholly consumed or combined with the metal when they are rolled or forced over into the melting-chamber A', which, though forming part of or a lower continuation, as it were, of the furnace, is separated therefrom by a movable partition or partitions, $f$, for opening or closing communications between it and the upper or carbonizing chamber.

The melting-chamber A' is designed to be kept partly full of molten steel, in which the carburet or spongy masses from the chamber A are immersed, and where they are melted down; and when sufficiently heated and manipulated, by bar or otherwise, through an opening in the outer end of said chamber, which is usually covered by a door or doors, and the requisite ingredients added to or skimmed off the molten metal to produce good steel or similar metal, a tap-hole, $g$, may be opened and the molten metal run off into a mold, D To retain the heat, or an equally high degree of heat, in the outer end of the melting-chamber, it is requisite to have double doors and a heated space between them. In this space heated gas or gases, heated or cold air, may be admitted; and by operating the said doors the said gas or gases or air may be admitted into and over the molten metal, chemically changing the nature of the same at the will of the operator.

The mold carbonizing and melting chambers are all represented as heated by a gas generating and reheating or regenerating apparatus for heating and reheating the gas or gases on their way from the gas-generators E to the chamber of combustion, and also for heating the air for supporting combustion or other purposes, although the said chambers may be heated by other means than those described and shown.

The advantages of the heated air and the heated gas or gases, in their chemical action on the ore and metal, are apparent.

The deoxidization and carbonization of some kinds of ore may be wholly effected from the ore into carburet of iron or steel by the action of the heat and heated gases alone, which may be passed through the mass or masses of the ore, or in close contact with the finely-divided particles; but the process of mixing the carbonizing matter with the ore is preferable as to cost of producing steel direct from the ore.

The peculiar features and advantages of the kind of calorific or heat regenerator herein shown may be better understood by reference to the specification in the application marked Case A, and filed herewith for a separate patent on the same. I will, however, describe its manner of construction and its action and use as relates to these particular furnaces. E is the fire-place on the gas-generating furnace, and F the gas passage or passages leading to the regenerator G, the regenerator or passages leading thereto being furnished with valves or dampers $i$ $i$, for regulating the supply of gas and air that passes to and up through the tubes $j$. The heat abstracted, reclaimed, or regenerated from the hotter current or currents is communicated indirectly by opposite surface action to the less heated current or currents of gas and air which are passing in the direction of the arrows in Fig. 6, Sheet 2, ultimately uniting at the hottest point to produce a lively combustion, the products of which or waste heat or gas are afterward to circulate preferably in a return manner by means of partitions $k$, Figs. 5, 10, and 11, around the outside of said tubes, and up into the lower end of the carbonizing-chamber A, or exterior of the tunnel to be utilized therein, if desirable; or they may be passed directly to the chimney, and the heat to the carbonizing-chamber be communicated direct from the regenerator by apertures or passages $a'$, Figs. 7, 8, and 10, said heat passing outside of said chambers; or the gas may be passed into said chamber or tunnel by a suitable valve and opening, $c^2$, Fig. 10, for the purpose of deoxidizing and carbonizing the ore in said chamber. Heated air may also be admitted by opposite corresponding openings for igniting the gases therein.

Figs. 14, 15, 16, and 17 represent modifications of the deoxidizing, carbonizing, and melting chambers, and the gas-heating passages thereto, for a varied distribution or action of the heat on the ore or mass; and Fig. 18, a modification of the regenerating chambers or tubes.

The mold D may be constructed of clay or other refractory substance, or of cast-iron, lined or studded with projections, and coated inwardly with a refractory substance protruding beyond such projections; after which the pattern of the ingot or other casting is inserted, and the impression made in the refractory substance while wet and soft. The pattern is then withdrawn and the mold slowly dried. When dry, it is ready to be placed into the chamber H, in front of the melting-chamber A'. The gas and air turned on, the mold is or should be heated up to the highest point it will bear, when this mold is ready to receive the molten metal from the tap-hole $g$. Previously to tapping, a funnel-shaped cover may be placed on the top of the mold, having a small additional opening therein to admit a long pipe that will reach to near the bottom of the mold, through which carbureted hydrogen gas, or oil to form gas, or such gas or matter that will expel the atmospheric air, and substitute a gas that will combine with the metal, or such small portions of the gas as may be carried with the current of molten metal below the surface of the same to prevent the formation of honeycomb or air-holes in the body of the casting, may be admitted into the said mold. It is essential, before running off the metal, however, that the ore or metal in the melting-chamber A' should not only be reduced to the proper liquid state, and of proper consistency, but also be of a proper specific temperature; and it is advisable that it should be in sufficient quantity, so that after filling the mold a large surplus remains in the melting-chamber to melt down the succeeding feed or charge of sponge from the chamber A. After the mold is filled, the lid or cover should be placed on its chamber H, and the gas and air valves from the regenerator opened or regulated so as to keep up the heat in and around the mold-ingot or casting until the steel or similar metal composing the same has settled into a homogeneous mass or solid casting, when the gas and air may be wholly or partly turned off, allowing the casting or ingot gradually to be cooled sufficiently to admit of the withdrawal of the mold, leaving the casting or ingot in the mold chamber. Said casting or ingot may then be cooled, or heated and cooled, by turning on or off the gas and air until the inside and outside of it are of equal temperature, or thereabout, when it is ready to be hammered or rolled. Thus, at one or a continuous though graduating heat, the ore is converted into steel bars, or other finished products, castings, &c., the mold being heated and castings cast, cooled, or reheated in the one position, and in the one and same chamber, by aid of the gas heating or regenerative apparatus. The mold having been removed, the castings remaining may be reheated, softened, or hardened, tempered, or otherwise operated upon while in said chamber, by the action of various gases previous to hammering, rolling, or further working the same.

One of the advantages of my improvements is that the ore or iron from which the steel is made is not submitted to any burning heat or blast, and consequently will produce a better quality of steel from the same ore as would be made in the usual way. Another advantage is, that steel can be made with less fuel by my process, and consequently much cheaper than by the usual way; and by the employment of the heated mold-chamber, the reheating and frequently burning of the outside of a large ingot is saved and avoided.

The melting-chamber A' has all the advantages of the usual boiling, puddling, reheating, melting, or the crucible furnaces, and many advantages not in other furnaces. The workman can see in, work at, skim off, add to, or take away any or many ingredients, thereby enabling him to make and cast many kinds of metals or alloys of iron and other metals, or a fibrous and malleable, or a hard and brittle steel.

Having described my improvements, I claim—

1. Treating purified iron sands, or mechanically-purified ore, by preparing, mixing, forming, or packing it into lumps, balls, or cylinders, and afterward deoxidizing, carbonizing, melting, casting, and hammering or rolling the same at one or continuous, though varying, heat, substantially as described.

2. The combination of the furnace A with the melting pot or chamber A', constructed and arranged for deoxidizing, carbonizing, converting, and melting iron ore into steel, or metal having some of the properties of steel, substantially as described.

3. Preparing, mixing, and forming iron ore into lumps, balls, or cylinders, and packing the same into casings made of clay, cast or sheet iron, or any suitable material, for the purpose or purposes specified, and substantially as described.

4. The employment of a long narrow, nearly-horizontal, or slightly-inclined chamber, A, so constructed that ore in the form of lumps, balls, or cylinders may be fed in at one end of the said chamber or furnace, and discharged at the hollow end in the form of steel sponge, chemically changed as to the volatile matter combined with, or contained in, the said ore or metal, substantially as described.

5. The employment of a long narrow chamber, A, so constructed that it may be opened or closed at either end by gates or their equivalents, for the admission of the substances to be melted or converted into cast-steel or similar metal, and for the admission and discharge of air and gases, and for manipulating, with bars or otherwise, the substances under treatment therein, said chambers being also provided with a tap-hole and suitable movable partitions, or their equivalents, substantially as described.

6. The arrangement of a mold-chamber, H, in combination with a melting-chamber, A, substantially as and for the purposes described.

7. Converting purified iron sands, or mechanically-purified iron ore, into steel sponge, or into a deoxidized spongy mass, by aid of gas or gases arising from a gas generator, when the same is passed through a reheating operation, substantially as described.

8. The combination of a gas-generating furnace or apparatus, or passages leading therefrom, a gas and air heating, or a heat reclaiming or regenerative furnace, and apparatus with a chamber or chambers employed for chemically changing the volatile matter combined with iron ore or iron sponge, substantially as described.

9. The combination of a gas-generating furnace, or passage leading therefrom, and a reheating or regenerating furnace and apparatus, with a mold-chamber, H, for the purpose of heating or reheating this chamber, the mold or ingot or casting therein, for the purpose or purposes specified, and substantially as described.

10. The employment of intensely-heated molds for casting ingots therein, when employed for retaining the heat in the castings preparatory to and for hammering or rolling the same, substantially as described.

11. The employment in a heated mold, while casting or pouring the molten metal therein, of gas or gases for excluding the atmospheric air therefrom, substantially as described.

12. The combination of a gas-generating furnace or apparatus, operated in connection with a gas and air heating or a heat regenerating apparatus, with a deoxidizing and carbonizing furnace or chamber, for the purpose of heating the same, substantially as described.

13. The combination of a gas-generating furnace, operating in connection with a gas and air heating or a heat-regenerating apparatus, with a deoxidizing and carbonizing furnace or chamber, for the purpose of heating the same, substantially as described.

14. The combination of a gas-generating furnace, operating in connection with a gas and air heating or regenerating apparatus, with a melting chamber, furnace, or pot employed for melting or reducing steel sponge, and deoxidized sponge or carburet of iron in the form of sponge, into cast steel, or metal similar to or having some of the properties of cast-steel, substantially as described.

15. The combination of a gas-generating furnace or apparatus, or passage leading therefrom, with a stationary chamber, for deoxidizing magnetic proto or per oxide of iron, containing or not the oxide of titanium, or other metal or refractory matter.

16. The combination of a gas-generating furnace or apparatus, or the passage leading therefrom, with a stationary chamber, for reducing, heating, or melting of deoxidized sponge or ore in the form of sponge.

17. The combination of a gas-generating furnace or apparatus or passage leading therefrom, with a chamber for heating molds or the castings in the chamber in which they are formed.

18. The combination of a gas-generating furnace or apparatus, or passage leading therefrom, with reheating-tubes or a chamber containing heated tubes, constructed for and applied to the deoxidizing, heating, melting, or reduction of ores or metallic substances containing iron, and in the form of sponge, before, during, or after such treatment or treatments, substantially as described.

19. The employment of a heat-reclaiming or a heat-regenerative furnace or apparatus, in combination with a chamber employed for heating a vessel or crucible containing iron ore or metallic sponge, converting, cementing, and melting the same into steel.

20. The combination of a heat-reclaiming or heat-regenerative furnace or apparatus with a stationary vessel or chamber or chambers employed for converting, melting, and cementing steel or metallic substances into steel.

21. The immersion of steel sponge, or carburet-of-iron sponge, into a bath of molten steel, or metal similar in nature or quality to the sponge, so that the sponge may be melted, and also a homogeneous liquid mass formed of it and the metal constituting the bath, substantially as described.

THOS. J. CHUBB.

Witnesses:
WALTER HINCHMAN,
EDW. SCHAFER.